US008054778B2

(12) United States Patent
Polson

(10) Patent No.: US 8,054,778 B2
(45) Date of Patent: Nov. 8, 2011

(54) LAN/WWAN GATEWAY CARRIER CUSTOMIZATION

(75) Inventor: Peter Polson, Seattle, WA (US)

(73) Assignee: Junxion, Inc., Seattle, WA (US)

( * ) Notice: Subject to any disclaimer, the term of this patent is extended or adjusted under 35 U.S.C. 154(b) by 1146 days.

(21) Appl. No.: 11/595,487

(22) Filed: Nov. 10, 2006

(65) Prior Publication Data
US 2007/0104169 A1 May 10, 2007

Related U.S. Application Data

(60) Provisional application No. 60/735,301, filed on Nov. 10, 2005.

(51) Int. Cl.
H04L 12/64 (2006.01)

(52) U.S. Cl. ........ 370/328; 370/352; 370/330; 370/338; 370/345; 370/354; 370/350; 370/509

(58) Field of Classification Search .............. 455/556.1, 455/554.1, 435.2, 435.3, 436
See application file for complete search history.

(56) References Cited

U.S. PATENT DOCUMENTS

| 4,792,948 | A | 12/1988 | Hangen et al. |
| 5,179,555 | A | 1/1993 | Videlock et al. |
| 6,289,212 | B1 | 9/2001 | Stein et al. |
| 6,753,887 | B2 * | 6/2004 | Carolan et al. ................ 715/764 |
| 6,768,896 | B2 | 7/2004 | Tjalldin et al. |
| 6,801,777 | B2 | 10/2004 | Rusch |
| 7,269,727 | B1 | 9/2007 | Mukherjee et al. |
| 7,508,754 | B1 | 3/2009 | Sankaranarynan et al. |
| 7,562,393 | B2 * | 7/2009 | Buddhikot et al. ............. 726/26 |
| 7,624,165 | B2 | 11/2009 | Tucker et al. |
| 2002/0075844 | A1 | 6/2002 | Hagen |
| 2002/0085516 | A1 | 7/2002 | Bridgelall |
| 2002/0176366 | A1 | 11/2002 | Ayyagari et al. |
| 2003/0031153 | A1 | 2/2003 | Matsumoto |
| 2003/0035397 | A1 | 2/2003 | Haller et al. |
| 2003/0051041 | A1 | 3/2003 | Kalavade et al. |
| 2003/0133421 | A1 | 7/2003 | Sundar et al. |
| 2004/0037255 | A1 * | 2/2004 | Joong et al. ................... 370/338 |
| 2004/0103313 | A1 | 5/2004 | Kreiner et al. |
| 2004/0172658 | A1 | 9/2004 | Rakib et al. |
| 2004/0185830 | A1 | 9/2004 | Joao et al. |

(Continued)

FOREIGN PATENT DOCUMENTS

| GB | 2354605 A | 3/2001 |
| WO | 2004070970 A1 | 9/2004 |
| WO | 2005029901 A2 | 3/2005 |

OTHER PUBLICATIONS

International Preliminary Report on Patentability for Application PCT/US2006/043758, mailed May 14, 2008.

(Continued)

Primary Examiner — Charles Appiah
Assistant Examiner — Randy Peaches
(74) Attorney, Agent, or Firm — Schwabe, Williamson & Wyatt, P.C.

(57) ABSTRACT

A gateway adapted to establish a connection between itself and a WWAN, wherein the gateway has a WWAN interface adapted to receive data from and transmit data to the WWAN on behalf of devices of a LAN, is described herein. The gateway may further determine whether the WWAN interface is associated with a service agreement that provides for use of the gateway. If so, the gateway may operate the WWAN interface in accordance with the service agreement.

29 Claims, 16 Drawing Sheets

U.S. PATENT DOCUMENTS

2004/0208150 A1  10/2004  Chang et al.
2004/0219948 A1  11/2004  Jones et al.
2005/0053034 A1   3/2005  Chiueh
2005/0085245 A1   4/2005  Danneels
2005/0090248 A1   4/2005  Shen et al.
2005/0090283 A1   4/2005  Rodriquez
2005/0202825 A1   9/2005  Puranik et al.
2005/0204389 A1   9/2005  Prohel et al.
2005/0226178 A1  10/2005  Forand et al.
2006/0146846 A1   7/2006  Yarvis et al.

OTHER PUBLICATIONS

International Preliminary Report on Patentability for Application PCT/US2006/043998, mailed May 8, 2007.
International Search Report for Application PCT/US2006/043758, mailed Sep. 20, 2007.
International Search Report for Application PCT/US2006/043998, mailed May 8, 2007.
Office Action for U.S. Appl. No. 11/595,380, mailed Dec. 29, 2009.
Office Action for U.S. Appl. No. 11/595,380, mailed Jul. 21, 2010.
Office Action for U.S. Appl. No. 11/595,380, mailed Feb. 2, 2011.
Office Action for U.S. Appl. No. 11/392,454, mailed Sep. 17, 2008.
Office Action for U.S. Appl. No. 11/392,454, mailed Apr. 1, 2009.
Office Action for U.S. Appl. No. 11/392,454, mailed Sep. 30, 2009.
Office Action for U.S. Appl. No. 11/392,454, mailed May 4, 2010.
Non-Final Office Action mailed Apr. 28, 2011 for U.S. Appl. No. 11/595,380.

* cited by examiner

LAN/WWAN GATEWAY CARRIER CUSTOMIZATION

PRIORITY CLAIM

This application claims priority to U.S. provisional patent application No. 60/735,301, filed on Nov. 10, 2005, and entitled "LAN/WWAN Gateway Carrier Customization;" and as a continuation-in-part to U.S. non-provisional patent application Ser. No. 11/392,454, filed on Mar. 29, 2006, and entitled "LAN and WWAN Gateway," which claims priority to U.S. provisional patent No. 60/667,175, filed Mar. 30, 2005.

FIELD OF THE INVENTION

Embodiments of the present invention relate to the field of data communication. More specifically, some embodiments of the present invention are related to bridging local area networks (LAN) and wireless wide area networks (WWAN).

BACKGROUND

Advances in microprocessor related technology have lead to widespread development and the adoption of computing devices. Computing powers that used to be available only in expensive mainframe computers requiring special operating environments are now available in many personal-computing (PC) devices. The form factors vary from desktop, laptop, palm-sized, and so forth. A number of these computing devices are packaged as "purpose" devices, such as set-top boxes, entertainment personal digital assistants (PDA), pagers, text messengers, game devices, smart appliances and wireless mobile phones.

Concurrently, advances in networking, telecommunications and related technologies, in particular, in the area of wireless networking/communications, have led to increased connectivity between computing devices over local, private, wide area, and/or public networks. Of particular notoriety is the Internet.

Today, local area networks may be wired or wireless. Similarly, wide area networks may be wired or wireless. Examples of the former include UWB, Ethernet, serial, WiFi, and Bluetooth. Examples of the latter include cellular, PCS, or WiMAX wireless networks offered by various wireless network service providers, such as Cingular, Sprint, T-Mobile, and Clearwire.

BRIEF DESCRIPTION OF THE DRAWINGS

The present invention will be described by way of exemplary embodiments but not limitations, illustrated in the accompanying drawings in which like references denote similar elements, and in which.

DETAILED DESCRIPTION OF ILLUSTRATIVE EMBODIMENTS

Illustrative embodiments of the present invention include but are not limited to methods and apparatuses for establishing, by a gateway, a connection between itself and a WWAN, wherein the gateway has a WWAN interface adapted to receive data from and transmit data to the WWAN on behalf of one or more devices of a LAN. The gateway may further determine whether the WWAN interface is associated with a service agreement that provides for use of the gateway. If so, the gateway may operate the WWAN interface in accordance with the service agreement or in accordance with one or more features of the service agreement.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
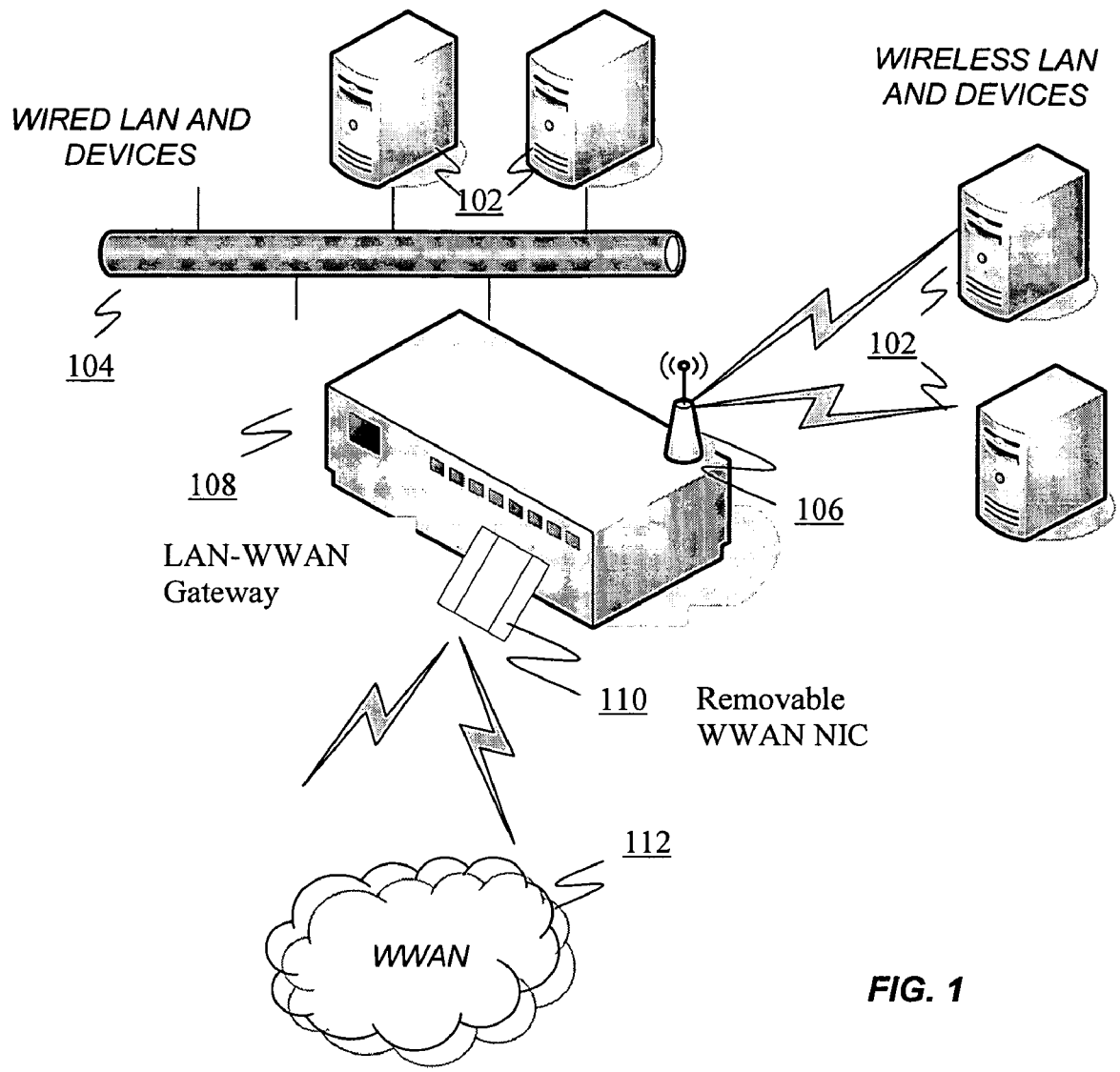
FIG. 1 illustrates a system view of an example operating environment suitable for use to practice the present invention, in accordance with various embodiments.

FIG. 1 illustrates a system view of an example operating environment suitable for use to practice the present invention, in accordance with various embodiments. As illustrated, gateway 108 has one or more local networking interfaces, such as wireless LAN interface 106, adapted to receive data from, and transmit data to one or more devices 102 of one or more LANs, such as the wireless LAN shown as connected to gateway 108 through local networking interface 106. Gateway 108 further comprises a socket adapted to removably receive a selected one of a first and a second WWAN interface, such as WWAN interface 110, the interface adapted to receive data from, and transmit data to a recipient gateway device (not shown) through a first and/or a second WWAN, such as WWAN 112. Further, gateway 108 includes subscriber determination logic capable of determining whether WWAN interface 110 is associated with a service agreement. Additionally, gateway 108 comprises a routing engine coupled to a local networking interface and the socket, and adapted to transmit data received from one or more devices 102 of a LAN 104 to a recipient gateway device through a first WWAN 112, and selectively transmit data received from the recipient gateway device through the first WWAN 112 to the one or more devices 102 of the LAN 104, if a first WWAN interface 110 is removably received by a socket of the gateway, and transmit data received from the one or more devices 102 of the LAN 104 to a recipient gateway device through a second WWAN (not shown), and selectively transmit data received from the recipient gateway device through the second WWAN to the one or more devices 102 of the LAN 104, if the second WWAN interface is removably received by the socket.

In various embodiments, the one or more devices 102 of one or more LANs may be any sort of computing device known in the art, such as PCs, workstations, servers, PDAs, pagers, text messengers, game devices, smart appliances, wireless mobile phones, cameras, and GPS receivers. The devices may connect to the LAN using any sort of connection known in the art, such as a TCP/IP connection, or an ATM virtual connection. Devices 102 may further receive data from a LAN 104 and may transmit data to the LAN 104. Data to be transmitted and/or received may include both content and requests for content, and may consist of any sequence of zero, one, or more bits.

As shown, gateway 108 may be connected to either a wired and/or a wireless LAN. A LAN connected to gateway 108 may use common standards for data transmission, such as Ethernet, Bluetooth, and 802.11, although the LAN may use any standard for data transmission known in the art. LAN 104 may further comprise a LAN router (not shown) capable of routing LAN traffic between devices 102 of the LAN 104, and of routing traffic from any one or more devices 102 of the LAN 104 that is directed to a WWAN to gateway 108. In alternate embodiments, gateway 108 may additionally act as the LAN router, receiving traffic from one device 102 of LAN 104 and directing traffic back to another device 102 of the same LAN 104. The one or more devices 102 of LAN 104 may all be located in the same building or room, as in the case of a wired LAN, or in the same geographic area, as in the case of a wireless LAN. Because of the geographic proximity and limited number of hops for a given transmission, data may be transferred across a LAN at a high rate of speed.

In some embodiments, local networking interfaces may be of any sort known in the art, including Ethernet interfaces, Bluetooth interfaces, and 802.11 wireless interfaces, such as wireless local networking interface 106. The local networking interface may thus consist of a PC card to be received by a PC card port of gateway 108, a miniPCI wireless interface, an interface embedded into the PCB, or a radio antenna, the PC Card, miniPCI, embedded interface, and/or antenna facilitating 802.11 wireless transmission. The local networking interface may also consist of an Ethernet port of gateway 108 receiving an Ethernet cable, the cable further connected to, in some embodiments, a LAN router.

As is further shown, gateway 108 may have multiple local networking interfaces, such as an interface connected to wired LAN 104 and a wireless local networking interface 106 connected to a wireless LAN. In alternate embodiments, gateway 108 may comprise multiple wired LAN interfaces, multiple wireless LAN interfaces, or some combination of one or more of both. Additionally, the routing engine of gateway 108 described above may be further adapted to transmit data received from a device 102 of one LAN 104 to another device 102 of a second LAN.

Additionally, in various embodiments, gateway 108 may further comprise a configuration/management process (not shown) to provide a LAN IP address to all devices 102 of a LAN 104 that may not change if the WWAN 112 is temporarily disconnected. Thus, transmission of LAN-to-LAN traffic is facilitated even in the absence of a WWAN connection.

Further, as is used herein, the term "gateway" refers to any computing device capable of facilitating transmission of data from one or more LANs to one or more WWANs, and transmission of data from the one or more WWANs to the one or more LANs. The interfaces, sockets, subscriber determination logic, routing engine, other processes, and storage comprising the gateway 108 may, in some embodiments comprise a single enclosure. Additionally, gateway 108 may be provided with LED lights and display screens on the gateway 108 or on an attached peripheral device to indicate the status of the gateway 108 as well as the status of the LAN and/or WWAN connections.

In some embodiments, gateway 108 may be adapted to be powered through a wall outlet, a vehicle power adapter, or an internal or external battery. Inclusion of the latter power supplies enables the gateway 108 to be used in portable settings. For example, teams of users may carry the gateway 108 in a briefcase or bag. Gateway 108 may also be mounted in a building, vehicle, server rack, or other fixed location.

Also, gateway 108 may adjust the power available to the LAN or WWAN network interfaces 106/110 to improve performance. For example, more power to either the LAN or WWAN network interfaces 106/110 may improve the speed, persistence, and reliability of the interface. Less power to either interface may reduce the power requirements of the gateway 108 and, when used with a battery, extend the operating time before the battery power is drained.

In various embodiments, gateway 108 may include subscriber determination logic adapted to determine whether a WWAN interface 110 for accessing WWAN 112 is associated with a service agreement between a subscriber and the wireless service provider associated with WWAN 112. Once a connection is established with WWAN 112 (see below for further details on establishing the connection), the subscriber determination logic of gateway 108 may determine whether the WWAN interface 110 being used is associated with a service agreement having one or more features specifying the terms for use of gateway 108. If the service agreement associated with the WWAN interface 110 permits use of gateway 108, then gateway 108 may operate the WWAN interface 110 in accordance with the service agreement, which may include providing connectivity to the applicable network according to the features of the service agreement and/or the policies of the wireless service provider. If the service agreement associated with the WWAN interface 110 does not permit use of the gateway 108, then gateway 108 may restrict WWAN 112 access. In one embodiment, more than one WWAN interface 110 may be available for use by gateway 108 to establish a WWAN 112 connection, and the subscriber determination logic of gateway 108 may further be adapted to determine service agreements, if any, for each WWAN interface 110. In one embodiment, gateway 108 may have and operate a plurality of WWAN interfaces 110, may determine service agreements for each interface 110, and, for each interface 110 associated with a service agreement, may operate the interface 110 in accordance with the service agreement.

Service agreement features and/or wireless service provider policies may restrict WWAN 112 access in any number of ways, including limitations on the number of simultaneous WiFi or Ethernet LAN 104 connections, the quality of service (e.g., of a suitable level to support Voice-over-IP), the throughput provided, the cumulative bits per hour, day or month, port-forwarding, on-board VPN, etc. In cases where the WWAN interface 110 is not associated with a service agreement that includes access through gateway 108, gateway 108 may also block all WWAN 112 traffic.

In various embodiments, the subscriber determination logic of gateway 108 may facilitate a subscriber in altering their existing WWAN 112 access ability on attempting WWAN 112 access via gateway 108. In some such embodiments, the subscriber may be able to change their service agreement to one that allows for WWAN 112 access via gateway 108, or to purchase WWAN 112 access on another basis, e.g., a certain period of time, a certain quantity of bytes downloaded, etc. An example of a service agreement that does not permit use of gateway 108 may be a service agreement that envisions the subscriber only being able to use a single computer at a time to access the carrier's WWAN 112. Another example of a service agreement that doesn't permit a gateway 108 is one that's designed specifically for a phone. In a subset of such an example, the service agreement may permit use of gateway 108, but only in connection with a single computer at a time. Other examples may vary from the ones provided.

In some embodiments, the subscriber determination logic of gateway 108 may determine the existence of a service agreement and its features by the IP address assigned to the WWAN interface 110 by the wireless service provider. When gateway 108 connects to WWAN 112, gateway 108 may interrogate a server, such as a server of the wireless service provider, to determine what policies are associated with the WWAN interface 110's IP address. IP addresses may be categorized in any number of ways in relation to network accessibility. For example, some IP addresses may permit complete WWAN 112 access, while other IP addresses may have policies associated with them that may partially or completely restrict WWAN 112 connectivity.

In one embodiment, where WWAN 112 is a GSM network, the subscriber determination logic of gateway 108 may base WWAN 112 connectivity on the Access Point Name (APN) assigned by the wireless service provider. For example, gateway 108 may provide unrestricted WWAN 112 access for one set of APNs, while providing restricted access for another set of APNs. For example, the "proxy" and "public" APNs on one wireless service provider's network may provide restricted WWAN 112 access (with potentially varying levels of restricted access), but the custom APNs may provide unrestricted access. In some embodiments, the unrestricted and restricted APNs may be configured on gateway 108, or the subscriber determination logic of gateway 108 may access a server, such as a server of the wireless service provider, for updated information about the policies associated with specific APNs. Other GSM network embodiments may incorporate different network access management methods.

In some embodiments, the subscriber determination logic of gateway 108 may determine a subscriber identification module (SIM), a mobile identification number (MIN), or an extended service set ID (ESSID) of the WWAN 112 connection and then interrogate a server associated with the gateway 108, or with the wireless service provider, to determine one or more features of the service agreement and/or policies of the wireless service provider based on the SIM, MIN or ESSID. WWAN 112 access restrictions may then be configured on gateway 108 based on the one or more features of the service agreement, or based on one or more policies of the wireless service provider.

In some embodiments, the subscriber determination logic of gateway 108 may determine a subscriber identification module (SIM), a mobile identification number (MIN), or an extended service set ID (ESSID) of the WWAN 112 connection and then interrogate a server associated with the gateway 108, or with the wireless service provider, to determine one or more features of the service agreement and/or policies of the wireless service provider based on the SIM, MIN or ESSID. WWAN 112 access restrictions may then be configured on gateway 108 based on the one or more features of the service agreement, or based on one or more policies of the wireless service provider.

In some embodiments, LAN 104 users may be authenticated onto gateway 108 through an authentication system, such as, for example, RADIUS/AAA or other methods. Access to WWAN 112 and specific policies/service agreement features for WWAN 112 access may then be determined by the subscriber determination logic based on the results of the authentication.

In some embodiments, if the wireless service provider provides both landline network access and WWAN 112 access, and gateway 108 is connected to both, the subscriber determination logic of gateway 108 may coordinate the wired and wireless access. For example, subscriber determination logic may prefer one access method over the other. In some such embodiments, such coordination of wired and wireless access may be a feature of the service agreement, such as, for example, simultaneous wired and wireless access to maximize throughput for a premium service agreement. Another example of a service agreement may provide for wired access as a preference, unless wired access is unavailable. In some embodiments, such access preference may be dynamic, such as, for example, in the case of a wireless preference, with wireless being used unless signal conditions are such that better service is available via wired access.

Additionally, in various embodiments, gateway 108 may provide customizable components/indicia and an overall user experience based on the carrier/wireless service provider of the WWAN interface 110 being used. In one embodiment, gateway 108 may download and provide the customizable components/indicia based on features of the service agreement and/or based on wireless service provider policies. For example, for a given wireless service provider, the use of their WWAN interface 110 may invoke specific branding/indicia, customizable components, and provider-centric documentation. As an illustrative embodiment, a user interface of gateway 108 may be branded with a wireless service provider's information and logo. In some embodiments, the wireless service provider may also add or restrict certain customizable components/indicia to the gateway 108. In some such embodiments, addition or restriction of customizable components/indicia may be done in connection with different service agreement features of the wireless service provider. Gateway 108 may associate customizable components/indicia with different service agreement features in a wide variety of ways, including the operations described above in regard to associating WWAN 112 access to different service agreements. Gateway 108 may be configured to be wireless service provider specific to some degree, including completely configured, on shipment of gateway 108. In some embodiments, gateway 108 may be updated by an updating download operation, performed in a periodic manner or otherwise. Gateway 108 may customize to a certain wireless service provider on the first use of a WWAN interface 110 of the wireless service provider, downloading customization components upon initialization of a wireless service provider's WWAN interface 110. In some embodiments, further customization may be implemented by a wireless service provider for a certain customer, for example for a large corporate customer of the wireless service provider.

In one embodiment, a WWAN interface 110 may not be specifically tied to a particular wireless service provider, but may be capable of accessing one or more wireless service providers. Such a WWAN interface 110 may be sold by a "virtual" wireless service provider that has arranged for use of the service of one or more WWAN 112 wireless service providers. In some embodiments, gateway 108 may be customized for the virtual wireless service provider. For example, the features of gateway 108 for the virtual wireless service provider may vary on the WWAN 112 being accessed, as in the example case of the virtual wireless service provider having different service agreements with different WWAN 112 wireless service providers. In some embodiments, a user may select which wireless service provider's WWAN 112 they would prefer. The user may select the wireless service provider's WWAN 112 in the context of available network characteristics, including, for example, throughput and the like. In some embodiments, pricing may be displayed in the context of selecting a wireless service provider's WWAN 112.

In various embodiments, the routing engine of gateway 108 may facilitate two-way transmission of data to and from the one or more LANs and to and from one or more WWANs. As mentioned above, capabilities of the routing engine may be affected by the results of the subscriber determination logic. That is, receipt from and transmission to a WWAN may be based on a service agreement between a user and a wireless service provider. Also, transmission of data from one device 102 of a LAN 104 to another device 102 of a second LAN is described in greater detail above.

When receiving data from a device 102 of a LAN 104 destined for a WWAN 112, the routing engine of gateway 108 may, in some embodiments, determine if the data received from the device 102 is a request for content from the WWAN 112, and may further determine if such content is cached in storage of gateway 108. If the content is cached, the routing engine may simply retrieve the requested content from the storage of gateway 108, and transmit the content to the device 102 of LAN 104 requesting the content. In such embodiments, no current connection to WWAN 112 is required. In one embodiment, if the subscriber determination logic has determined that the WWAN interface is not associated with a service agreement, the routing module may not provide the cached content.

If on the other hand the content is not cached, or the data received from device 102 of LAN 104 is not a request for content, the routing engine may, in various embodiments, compress the received data prior to transmitting it. By compressing the data, the routing engine may facilitate transmission of the data at a higher speed than might otherwise be achieved, especially given the typically low speeds at which data is transmitted across a WWAN. Such compression may be achieved through recourse to any compression algorithm known in the art, such as Huffman, Lempel-Ziv, or Venturi, or any combination of such algorithms.

In some embodiments, the routing engine of gateway 108 may determine whether the gateway 108 is connected to any gateway of any WWAN 112 before attempting transmission of data to the WWAN 112. In some embodiments, as mentioned above, the subscriber determination logic, rather than the routing engine of gateway 108, may make this determination. The gateway 108 may determine whether a connection exists by pinging an address of a WWAN 112 and listening for a reply. If no reply is received, the gateway 108 may wait some pre-determined time and try again. After a certain number of attempts have been met without success, the gateway 108 may, in some embodiments, buffer the data to be transmitted in some sort of data structure and continue on an intermittent basis to attempt connection to the WWAN 112. Once a connection has been achieved, the buffered data may then be transmitted to its appropriate destination.

In other embodiments, gateway 108 may also include a networking interface to receive a wired WAN connection. Such a connection may be achieved via an Ethernet plug and cable received into an Ethernet port of the gateway 108. In such embodiments, the wired WAN connection may serve as a backup that the gateway 108 may switch to if the WWAN 112 connection is unavailable. Gateway 108 may then attempt connection with the wired WAN, in some embodiments by pinging the wired WAN. If the wired WAN is also unavailable, gateway 108 may buffer the data in the manner described above. In one embodiment, the wired WAN connection may be a wired connection to a wireless device, such as a device having a cellular or satellite modem.

Still in other embodiments, a configuration/management process of gateway 108 such as the one described above may communicate the status of the WWAN 112 to the one or more devices 102 of the one or more LANs 104 through a web page. Such status information may include availability of (connection to) WWAN 112, WWAN 112 signal strength, the WWAN 112 IP address, and statistics about the users and data being transmitted through the WWAN 112. Example user interfaces capable of communicating status information are illustrated by FIGS. 9-15 and are described in greater detail below.

In various embodiments, a configuration/management process of gateway 108 may be adapted to shut down or otherwise restrict transmission to the LAN 104 or a second LAN when no WWAN 112 access is available.

Additionally, in some embodiments, gateway 108 may be adapted to prioritize specific data over the WWAN 112 to manage conflicts between devices 102 of LANs 104 that are sharing limited WWAN 112 capacity.

Once a connection to WWAN 112 has been determined to exist, however, the routing engine of gateway 108 may transmit the received data to its destination via the connected WWAN 112.

In still other embodiments, the routing engine of gateway 108 is adapted to transmit data received from a WWAN 112 to one or more devices 102 of one or more LANs 104. Upon receiving the data from WWAN 112, the routing engine may first, in various embodiments, decompress the data, if the data is compressed. As mentioned above, compression of data may result in higher transmission speeds across a WWAN 112, and may also be used to lower the connectivity cost to a user or reduce the load for a carrier. The routing engine may employ any compression algorithm known in the art to achieve decompression of the data, such algorithms including Huffman, Lempel-Ziv, Venturi, or any combination of such algorithms.

Upon decompressing the data, the routing engine may, in some embodiments, next determine if the data is content received from a device of a WWAN 112. If the data is determined to comprise some sort of content, such as a web page, a PDF, or any other sort of content known in the art, the routing engine may then determine if the content is cached in storage of gateway 108. If the received content is not cached, the routing engine, in various embodiments, may cache the content received from the WWAN 112 in a data structure of some type known in the art, and store the cached content in storage of gateway 108.

In some embodiments, the routing engine of gateway 108 may then transmit the received data to its destination device 102 via the LAN 104 to which destination device 102 is connected.

As is further shown, gateway 108 comprises a socket adapted to receive a WWAN interface 110. The WWAN interface 110 may be of any sort known in the art, such as cellular, PCS, and WiMax WWAN interfaces. The interface may come in the form of a PC Card or Modem, the PC Card or Modem capable of plugging into the socket of gateway 108.

In various embodiments, each WWAN interface may be adapted for a specific wireless service provider, as described above, and may be associated with a service agreement with that service provider. Thus, gateway 108 facilitates the switching of WWAN interfaces in areas where another provider having a different WWAN interface is stronger, or where the provider associated with the current WWAN interface 110 does not provide service. Accordingly, the use of multiple WWAN interfaces 110 with the socket of gateway 108 facilitates the mobility of the gateway 108, as described above.

In still other embodiments not illustrated, gateway 108 may support multiple WWAN interfaces removably received by multiple sockets of gateway 108. By employing multiple sockets and multiple WWAN interfaces 110, gateway 108 may facilitate connection to multiple WWAN service providers. If WWAN 112 is not available because of the location of the user, issues with the service provider of the WWAN 112, or because of the features of a service agreement, WWAN access may be provided via the other WWAN connection. However, one or more of the WWAN interfaces 110 may be built in. Additionally, the gateway 108 may be adapted to support multiple WWAN interfaces 110 connecting simultaneously to the same WWAN 112. The combination of networking interfaces may increase the performance, speed, and reliability of the WWAN 112 connection.

As is shown, WWAN 112 may comprise any sort of WWAN known in the art, such as a cellular, a PCS, or a WiMax WWAN. WWAN 112 may consist of a network of routers and gateways, of which gateway 108 is a part, working together to transmit data to various devices connected directly or indirectly to a router or gateway of WWAN 112, such as the devices 102 connected to gateway 108 via LAN 104. The routers and gateways of WWAN 112 may utilize any sort of connection type known in the art, such as TCP/IP connections or ATM virtual connections. Additionally, WWAN 112 may provide access to the Internet through another gateway or set of gateways.

In further embodiments, the gateway 108 may provide radio antenna enhancements for the WWAN 112 through either a passive or an active antennas apparatus in gateway 108. This antenna apparatus may be directional or omnidirectional. The radio antenna enhancements may improve the reliability, throughput, and performance of the WWAN 112. The enhancements may also provide improved performance for other nearby, unrelated devices using a WWAN, such phones or modems using cellular, PCS, WiMAX, or other WWAN networks.

Figure 2:
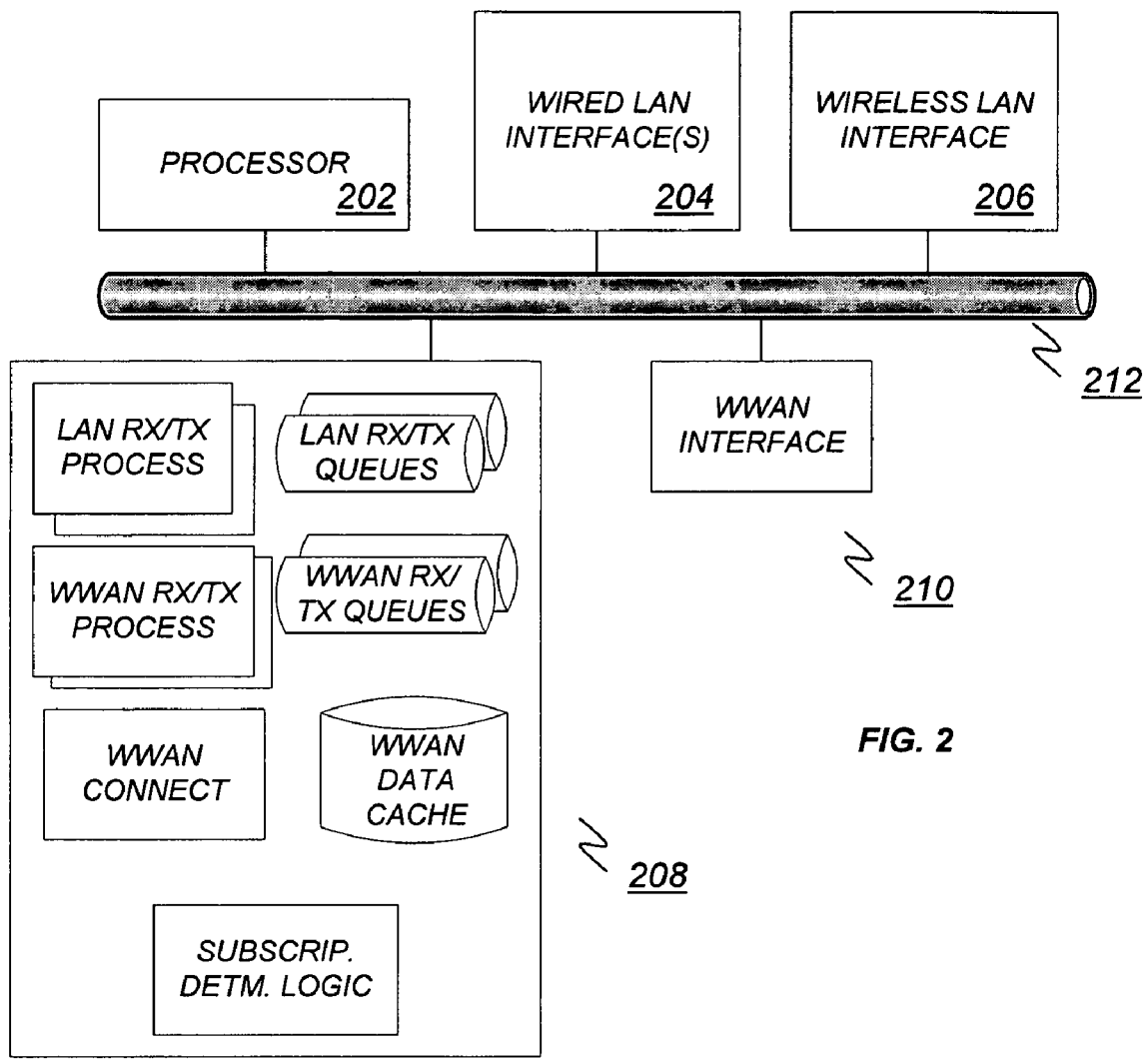
FIG. 2 illustrates an architectural view of a device suitable for use as a LAN-WWAN Gateway, in accordance with various embodiments.

FIG. 2 illustrates an architectural view of a device suitable for use as a LAN-WWAN Gateway, in accordance with various embodiments. As shown, gateway 108 may include one or more processors, such as processor 202 and persistent storage 208. Additionally, gateway 108 includes a plurality of networking interfaces, such as wired LAN interface 204, wireless LAN interface 206, and WWAN interface 210, and wired WAN interface (not shown). The LAN interfaces 204 and 206 may include 802.11, Bluetooth, and Ethernet local networking interfaces, as is described in greater detail above. Also, the WWAN interface 210 may be a cellular, a PCS, or a WiMax WWAN interface in the form of a removable PC Card, embedded modem, or other modem to connect to a WWAN 112, the WWAN interface also described in greater detail above.

In various embodiments, a card slot (not shown) may be used to allow users of gateway 108 to install or upgrade either the LAN or WWAN interfaces with updated LAN or WWAN interfaces. When new network interfaces and services are available, users can update the gateway 108 to support these interfaces and services by inserting a new interface into the LAN or WWAN card slot.

Further, the elements are coupled to each other via system bus 212, which represents one or more buses. In the case of multiple buses, the buses are bridged by one or more bus bridges (not shown). Each of these elements performs its conventional functions known in the art. In particular, persistent storage 208 is employed to store programming modules adapted to receive and transmit data to and from a LAN (shown as "LAN RX/TX Process"), to receive and transmit data to and from a WWAN (shown as "WWAN RX/TX Process"), to monitor the WWAN connection, and to determine whether a WWAN interface is associated with a service agreement (shown as "Subscriber Determination Logic"). Additionally, persistent storage 208 is also employed to store a WWAN data cache of cached WWAN content, and as well as data queues/buffers for data received from LAN 104, data to be transmitted to LAN 104, data received from WWAN 112, and data to be transmitted to WWAN 112. The instructions implementing the programming modules, the WWAN data cache, and the queues/buffers may be loaded into persistent storage 208 in the factory, or in the field, through a distribution medium (not shown) or through LAN and/or WWAN interfaces 204, 206, and/or 210.

Figure 3:
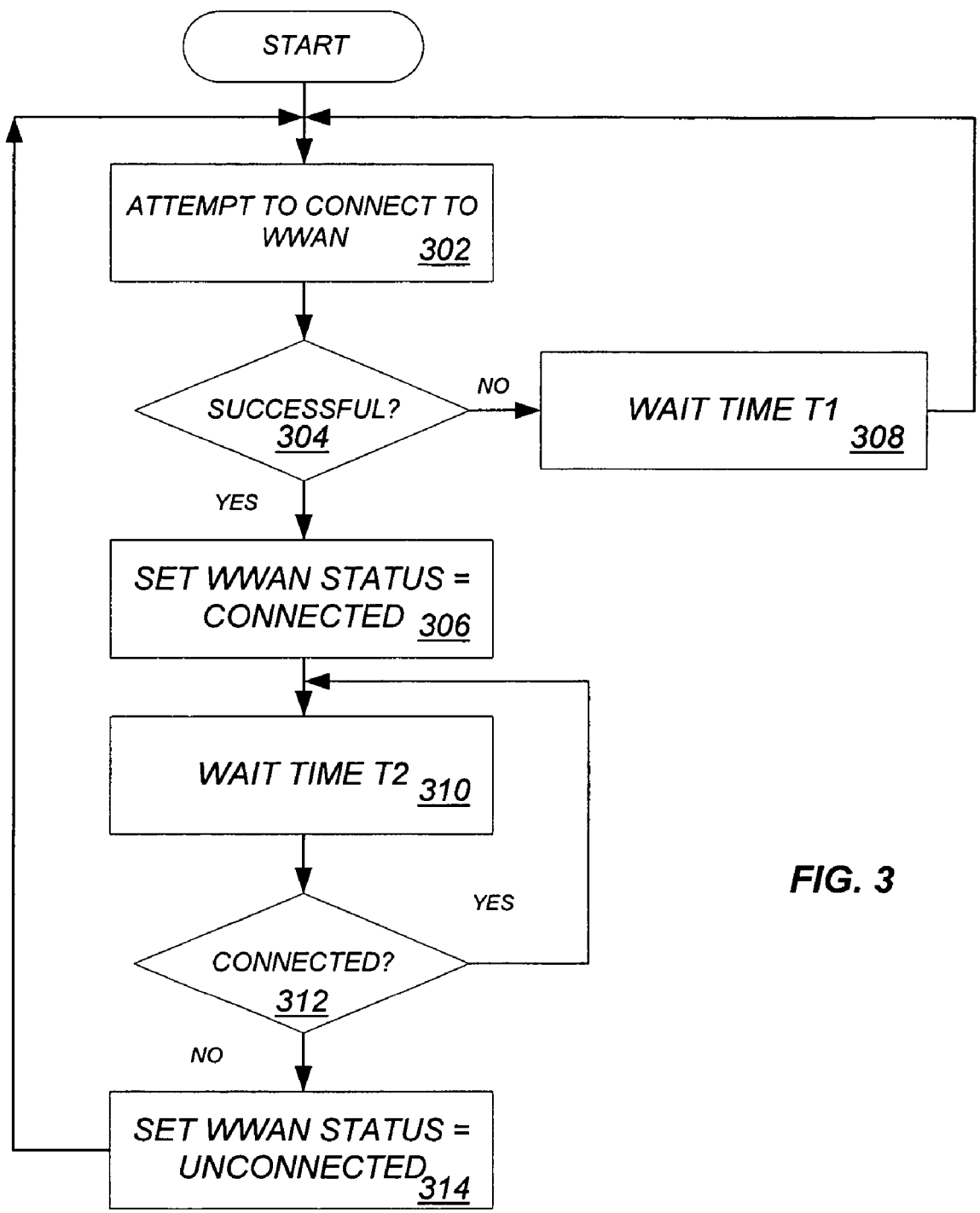
FIG. 3 illustrates the operational flow of selected aspects of a process at the Gateway for maintaining the WWAN connection.

FIG. 3 illustrates the operational flow of selected aspects of a process at the gateway 108 for maintaining the WWAN 112 connection.

In some embodiments, the gateway 108 may determine whether the gateway 108 is connected to any gateway of any WWAN 112 before attempting transmission of data to the WWAN 112. As is shown, the gateway 108 may attempt to connect to a WWAN 112, block 302, by pinging an address of a WWAN 112 and listening for a reply. If no reply is received, block 304, gateway 108 may wait some pre-determined time, here shown as time T1, block 308, and try again, block 302. After a certain number of attempts have been met without success, the gateway 108 may, in some embodiments, buffer the data to be transmitted in some sort of data structure and continue on an intermittent basis to attempt connection to the WWAN 112 (not shown). Once a connection has been achieved, the buffer data may then be transmitted to its appropriate destination. In other embodiments, the routing engine may additionally or instead automatically detect a loss of connection through drivers of gateway 108. The drivers may detect if there is a drop in the connection, at which point the routing engine determines that the WWAN 112 connection has failed. The routing engine may then attempt to reconnect or fail-over.

If on the other hand an attempt to connect to WWAN 112 was successful, block 304, gateway 108 may, in some embodiments, set a gateway 108 WWAN connection status variable to "connected," block 306, or where the variable is Boolean, to "true." At some pre-determined time interval, here shown as time T2, block 310, the gateway 108 may again attempt to connect to WWAN 112 to ensure that the connection still exists, block 312. This may again be accomplished by pinging an address of WWAN 112. If the connection is determined to exist, block 312, the gateway 108 may again wait a predetermined time T2, block 310, and attempt to connect to WWAN 112 again. On the other hand, if gateway 108 determines that a WWAN 112 connection no longer exists, block 312, the gateway 108 may, in some embodiments, set a gateway 108 WWAN connection status variable to "unconnected," block 314, or where the variable is Boolean, to "false." The WWAN connect process illustrated by FIG. 3 may then again loop back and attempt to reestablish a connection to WWAN 112, block 302.

In various embodiments, not illustrated herein, facilities may be provided to enable a user of gateway 108 to configure the address of the ping and the interval between pings, such as time intervals T1 and T2.

Figure 4:
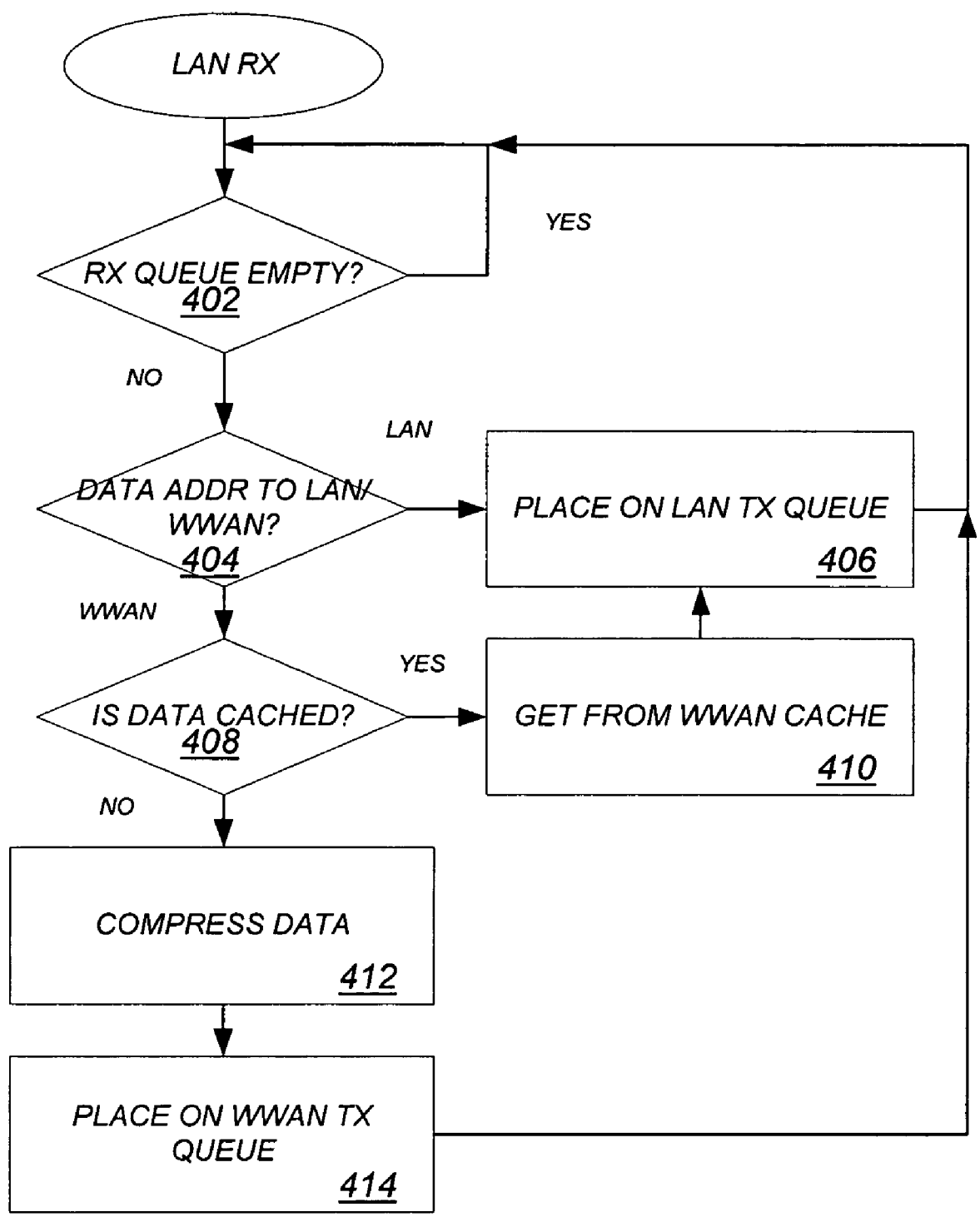
FIG. 4 illustrates the operational flow of selected aspects of a LAN Receive process at the Gateway for handling receipt processing of LAN data.

FIG. 4 illustrates the operational flow of selected aspects of a LAN Receive process at the gateway 108 for handling receipt processing of LAN data. As is illustrated, the routing engine implementing the LAN Receive process may first determine if a LAN Receive Queue of gateway 108 is empty, block 402. The queue may be implemented as any sort of data structure known in the art capable of organizing and storing data. Data received from a LAN may, in some embodiments, first be placed in this receive queue. If empty, the routing engine may check the queue periodically, on some basis, until it is not found to be empty. In other embodiments, received LAN data is processed as it is received, and is not placed in a receive queue. In yet other embodiments, the receive queue may contain buffered LAN data that has been placed in the queue to await transmission while a connection to a WWAN 112 is unavailable.

Upon determining that the receive queue is not empty, the routing engine implementing the LAN Receive process may next determine whether the received LAN data is destined for another device 102 of the same LAN 104 or of a second LAN, or whether the received data is destined for a device accessible over a WWAN 112, block 404. If destined for a device 102 of a LAN 104 or a second LAN, the data may be placed in a LAN Transmit Queue of gateway 108, block 406. The queue may be implemented as any sort of data structure known in the art capable of organizing and storing data. In other embodiments, the data may be transmitted immediately to the destination device 102 without being placed in such a queue.

As is shown, if on the other hand, the data is destined for a device accessible over a WWAN 112, the LAN Receive process of the routing engine may then determine whether the data is cached, block 408. Such a determination may be appropriate where the data received from a device 102 of a LAN 104 is a request for content from a device of a WWAN 112, and the content may be cached in the persistent storage 208 of gateway 108. If the content is cached, the routing engine may simply retrieve the requested content from the storage of gateway 108, block 410, and transmit the content to the device 102 of LAN 104 requesting the content. In alternate embodiments, rather than immediately transmitting the cached content, the LAN Receive process of the routing engine may place the cached content on a LAN Transmit Queue of gateway 108, block 406, such as the one described above. In such embodiments, no current connection to the WWAN 112 is required.

If on the other hand the content is not cached, or the data received from device 102 of LAN 104 is not a request for content, the LAN Receive process implemented by the routing engine may, in various embodiments, compress the received data prior to transmitting it, block 412. By compressing the data, the routing engine may facilitate transmission of the data at a higher speed than might otherwise be achieved, especially given the typically low speeds at which data is transmitted across a WWAN, and may also lower the connectivity cost to a user or reduce the load for a carrier. Such compression may be achieved through recourse to any compression algorithm known in the art, such as Huffman, Lempel-Ziv, or Venturi, or any combination of such algorithms.

After compressing the data, the LAN Receive Process may, in some embodiments, place the data in a WWAN Transmission Queue of gateway 108, block 414, to await transmission across WWAN 112. In alternate embodiments, the routing engine may, immediately following compressing, determine if a WWAN 112 connection exists, as is further illustrated and described above, and if such a connection exists, transmit the data across the WWAN 112 to its destination.

Figure 5:
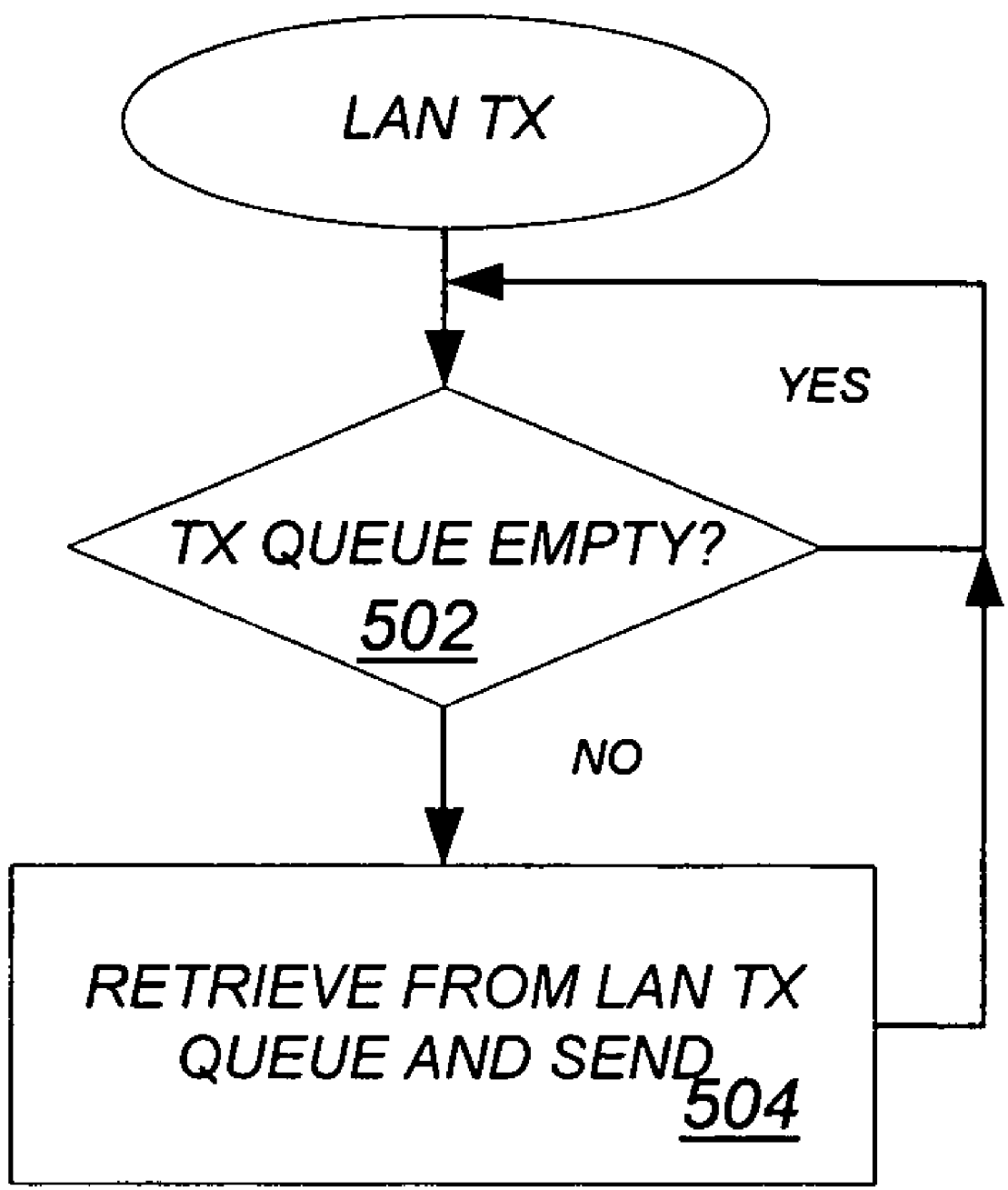
FIG. 5 illustrates the operational flow of selected aspects of a LAN Transmit process at the Gateway for handling transmission processing of LAN data.

FIG. 5 illustrates the operational flow of selected aspects of a LAN Transmit process at the gateway 108 for handling transmission processing of LAN data. As is illustrated, the routing engine implementing the LAN Transmit process may first determine if a LAN Transmit Queue of gateway 108 is empty, block 502. The queue may be implemented as any sort of data structure known in the art capable of organizing and storing data. Data to be transmitted to a device 102 of a LAN 104 may, in some embodiments, first be placed in this transmit queue. If empty, the routing engine may check the queue periodically, on some basis, until it is not found to be empty. In other embodiments, data to be transmitted to a device 102 of the LAN 104 is transmitted immediately after processing, and is not placed in a transmit queue.

As is shown, the LAN Transmit process implemented by the routing engine may next retrieve the data from the LAN Transmit queue and send the data to its destination device 102 via the LAN 104 connected to the gateway 108 via a local networking interface 106, block 504.

Figure 6:
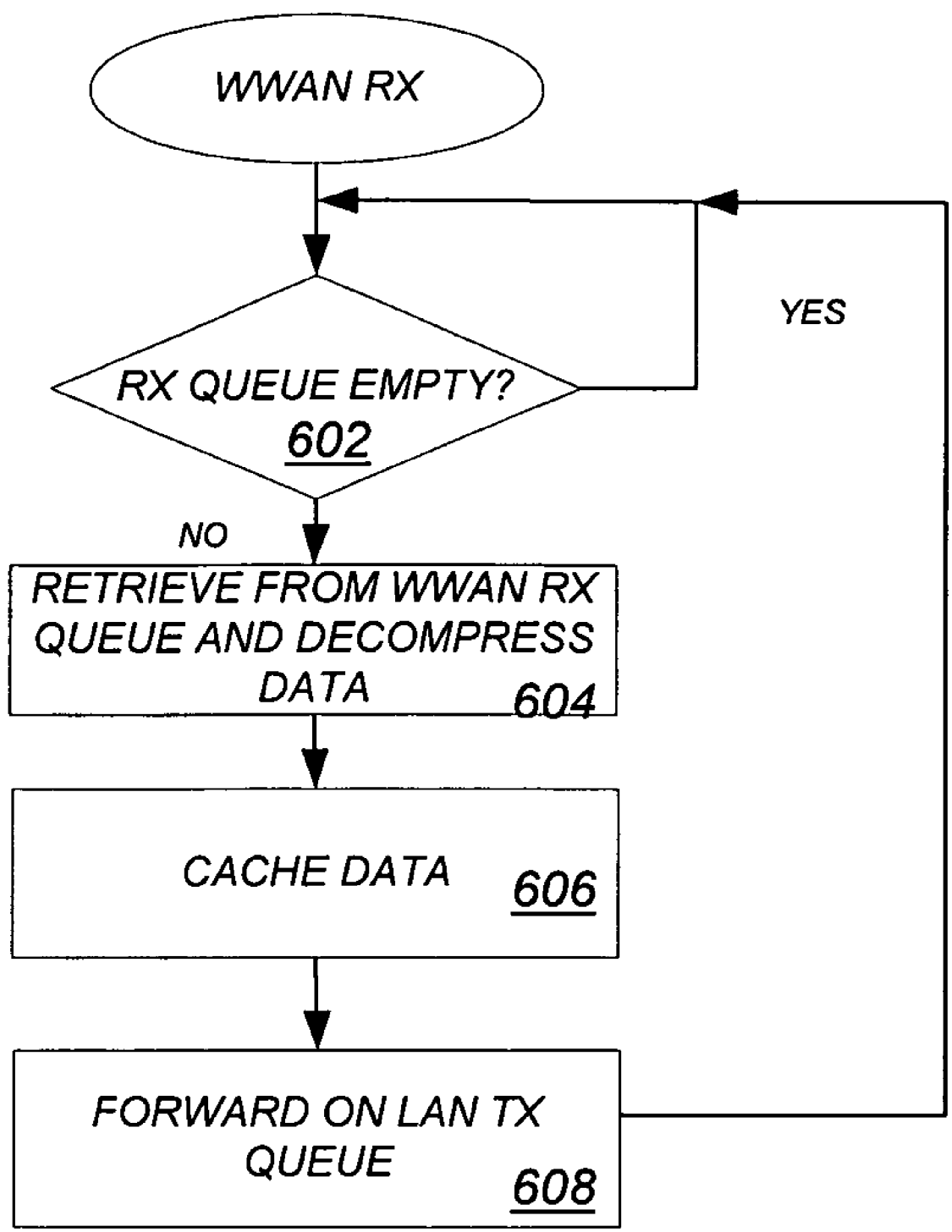
FIG. 6 illustrates the operational flow of selected aspects of a WWAN Receive process at the Gateway for handling receipt processing of WWAN data.

FIG. 6 illustrates the operational flow of selected aspects of a WWAN Receive process at the gateway 108 for handling receipt processing of WWAN data. As is illustrated, the routing engine implementing the WWAN Receive process may first determine if a WWAN Receive Queue of gateway 108 is empty, block 602. The queue may be implemented as any sort of data structure known in the art capable of organizing and storing data. Data received from a WWAN may, in some embodiments, first be placed in this receive queue. If empty, the routing engine may check the queue periodically, on some basis, until it is not found to be empty. In other embodiments, received WWAN data is processed as it is received, and is not placed in a receive queue.

In various embodiments, the WWAN Receive process implemented by the routing engine may next retrieve data from the WWAN receive queue and decompress the received data, block 604, if the data is compressed. As mentioned above, compression of data may result in higher transmission speeds across a WWAN 112, and may also be used to lower the connectivity cost to a user or reduce the load for a carrier. The routing engine may employ any compression algorithm known in the art to achieve decompression of the data, such algorithms including Huffman, Lempel-Ziv, Venturi, or any combination of such algorithms.

Upon decompressing the data, the WWAN Receive process of the routing engine may, in some embodiments, next determine if the data is content received from a device of a WWAN 112. If the data is determined to comprise some sort of content, such as a web page, a PDF, or any other sort of content known in the art, the routing engine may then determine if the content is cached in persistent storage 208 of gateway 108. If the received content is not cached, the routing engine, in various embodiments, may cache the content received from the WWAN 112, block 606, in a data structure of some type known in the art, and store the cached content in the persistent storage 208 of gateway 108. Other caching may be proactive, storing new data at non-peak hours when the WWAN 112 is underutilized.

After caching the data, the WWAN Receive Process may, in some embodiments, place the data in a LAN Transmit Queue of gateway 108, block 608, to await transmission to its destination device 102 of LAN 104. In alternate embodiments, the routing engine may, immediately following caching, transmit the data across the LAN 104 to its destination device 102.

Figure 7:
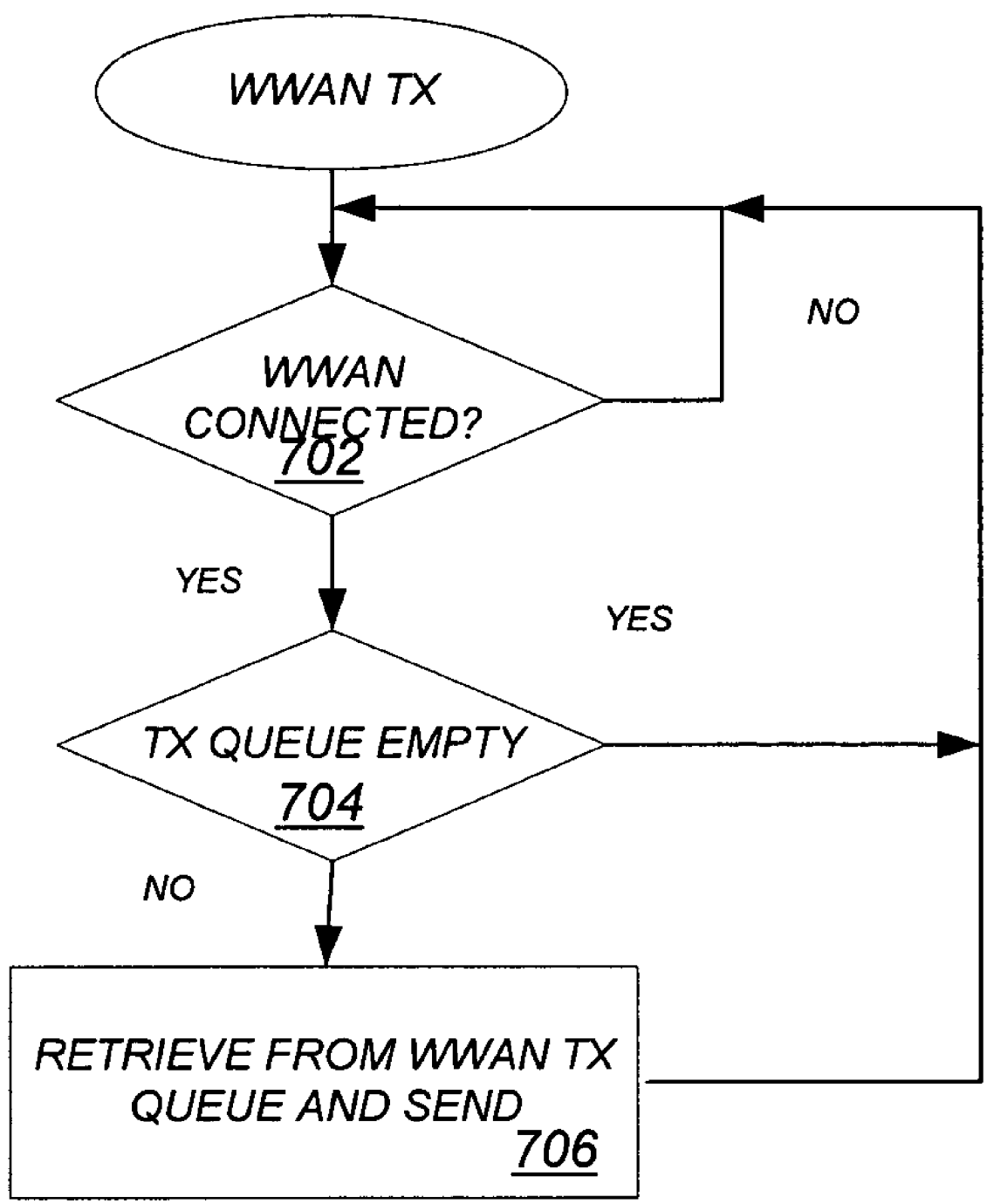
FIG. 7 illustrates the operational flow of selected aspects of a WWAN Transmit process at the Gateway for handling transmission processing of WWAN data.

FIG. 7 illustrates the operational flow of selected aspects of a WWAN Transmit process at the gateway 108 for handling transmission processing of WWAN data. As is illustrated, the routing engine implementing the WWAN Transmit process may first determine if a WWAN 112 connection exists, block 702. The operations for determining whether such a connection exists are illustrated by FIG. 3 and described in greater detail above.

As is shown, the routing engine implementing the WWAN Transmit process may then determine if a WWAN Transmit Queue of gateway 108 is empty, block 704. The queue may be implemented as any sort of data structure known in the art capable of organizing and storing data. Data to be transmitted to a device connected to a WWAN 112 may, in some embodiments, first be placed in this transmit queue. If empty, the routing engine may check the queue periodically, on some basis, until it is not found to be empty. In other embodiments, data to be transmitted to a device of the WWAN 112 is transmitted immediately after processing, and is not placed in a transmit queue.

As is shown, the WWAN Transmit process implemented by the routing engine may next retrieve the data from the WWAN Transmit queue and send the data to its destination device via the WWAN 112 connected to the gateway 108 via a WWAN interface 110.

Figure 8:
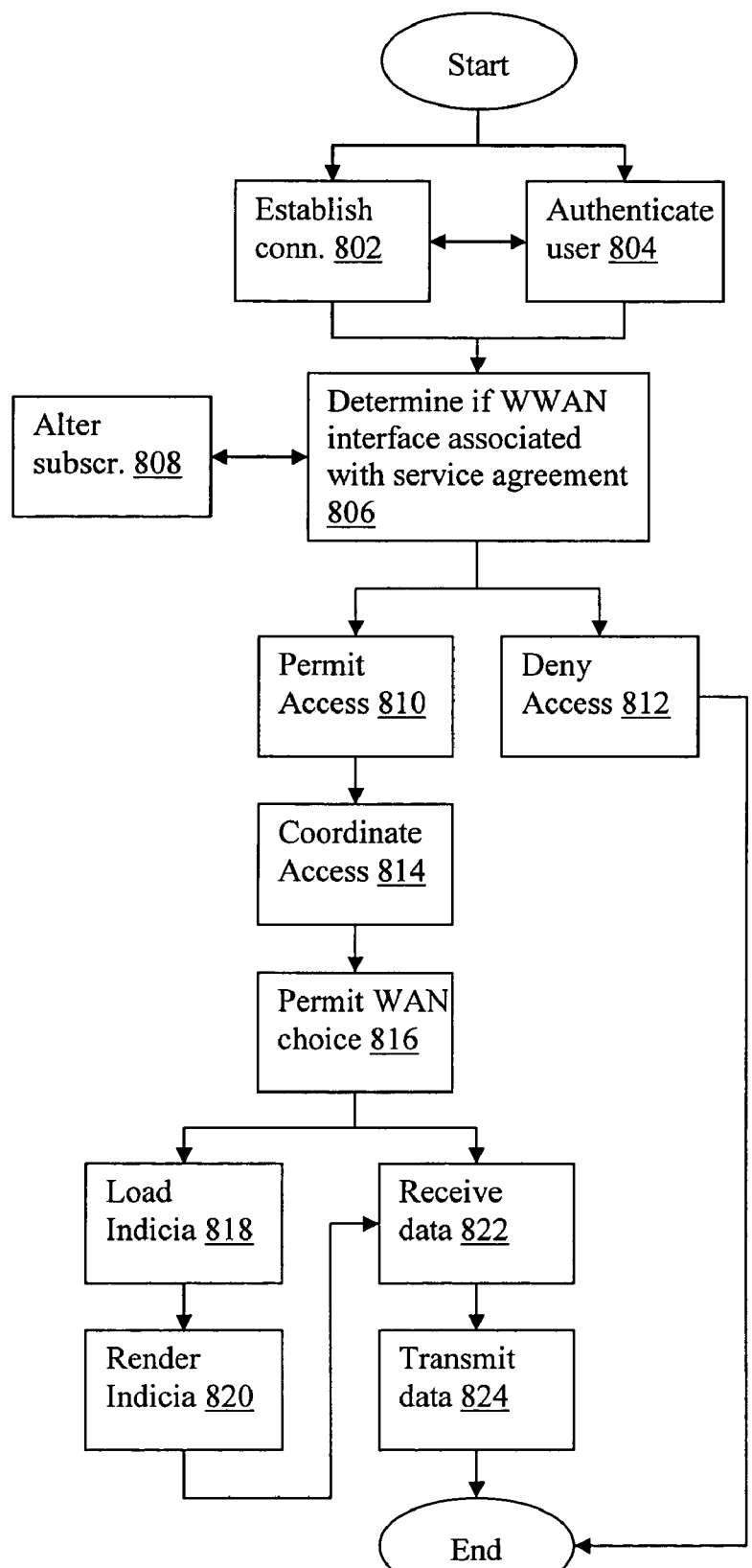
FIG. 8 illustrates the operational flow of selected aspects of regulating network access, in accordance with various embodiments of the invention.
Figure 9:
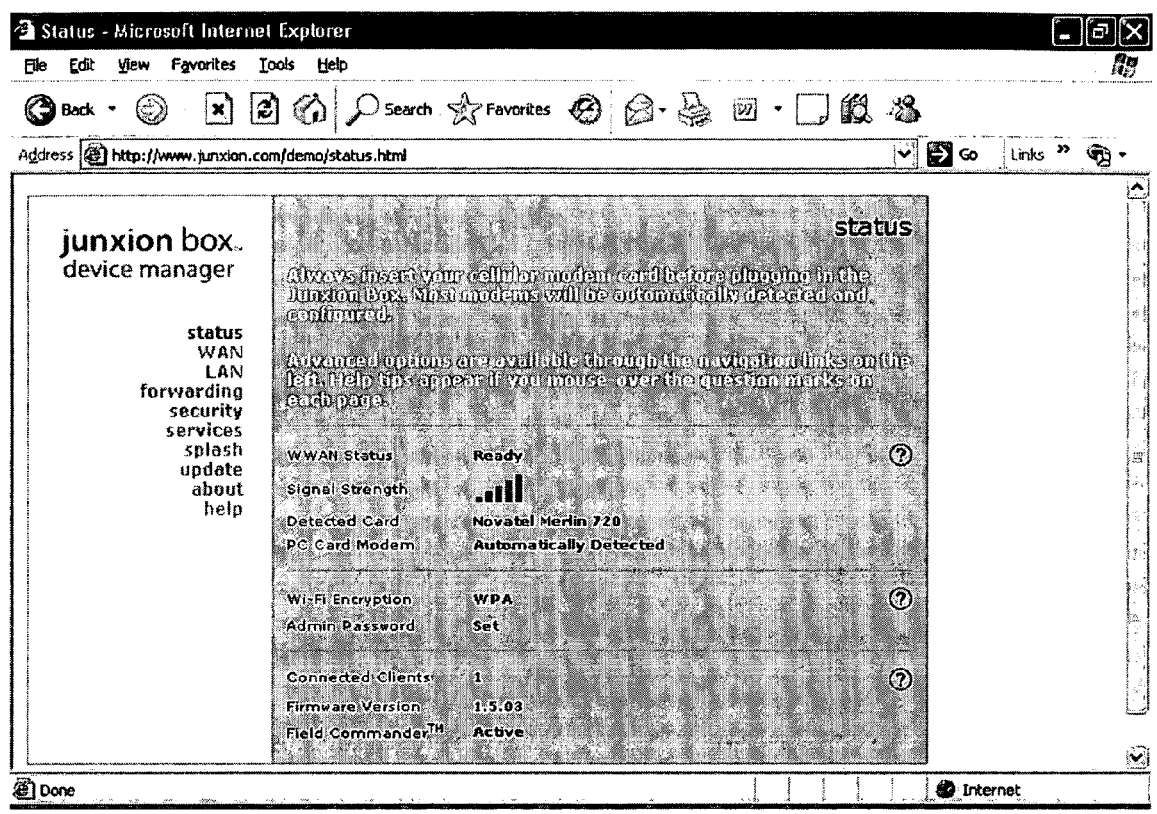
FIGS. 9-16 illustrate various graphical user interfaces associated with the gateway, in accordance with various embodiments of the invention.
Figure 10:
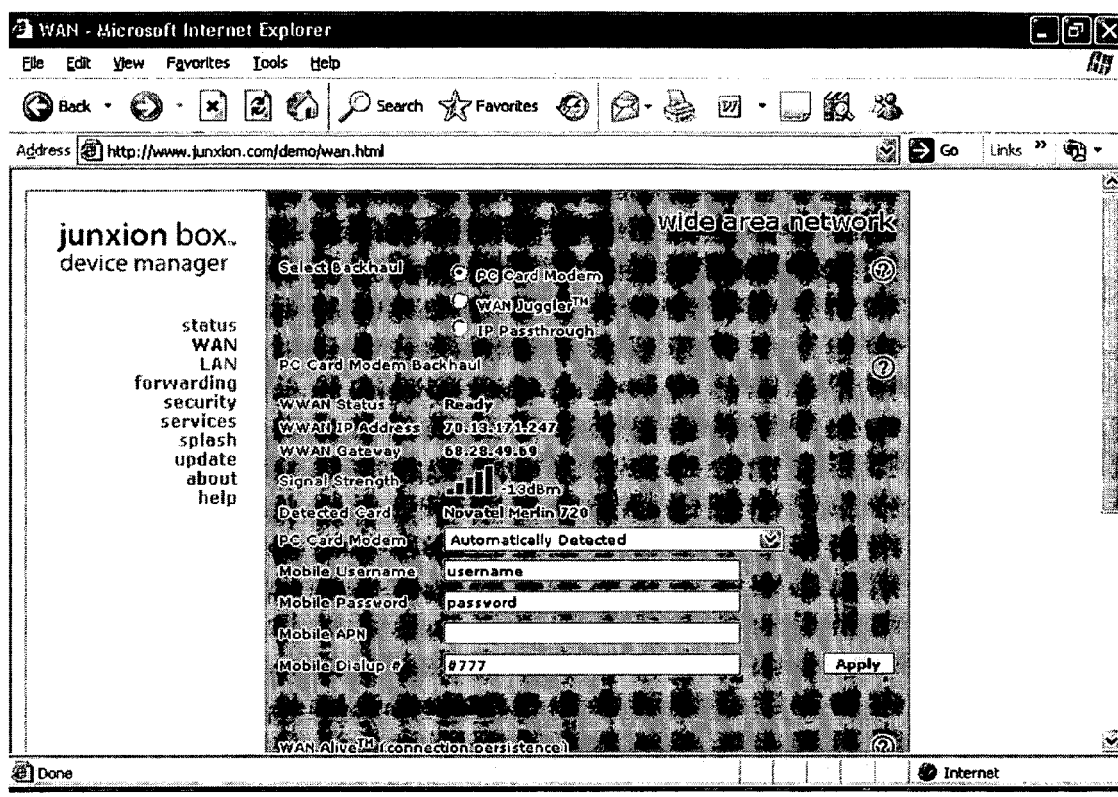
Figure 11:
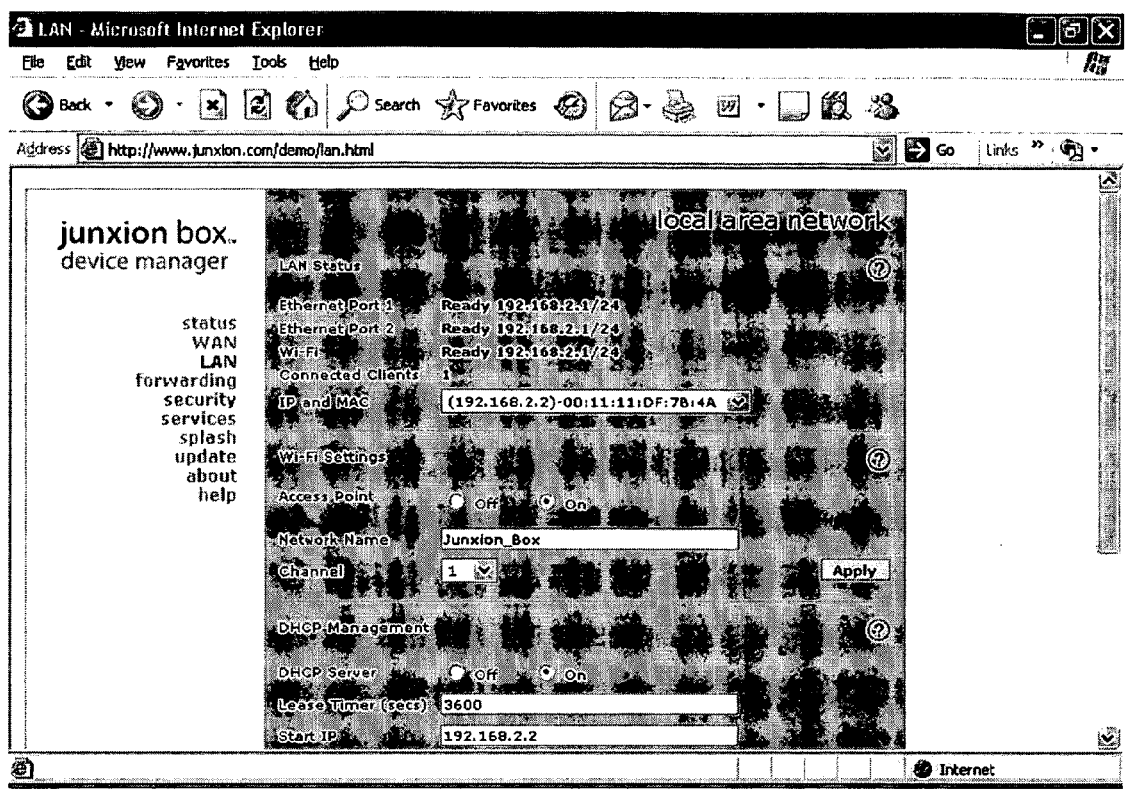
Figure 12:
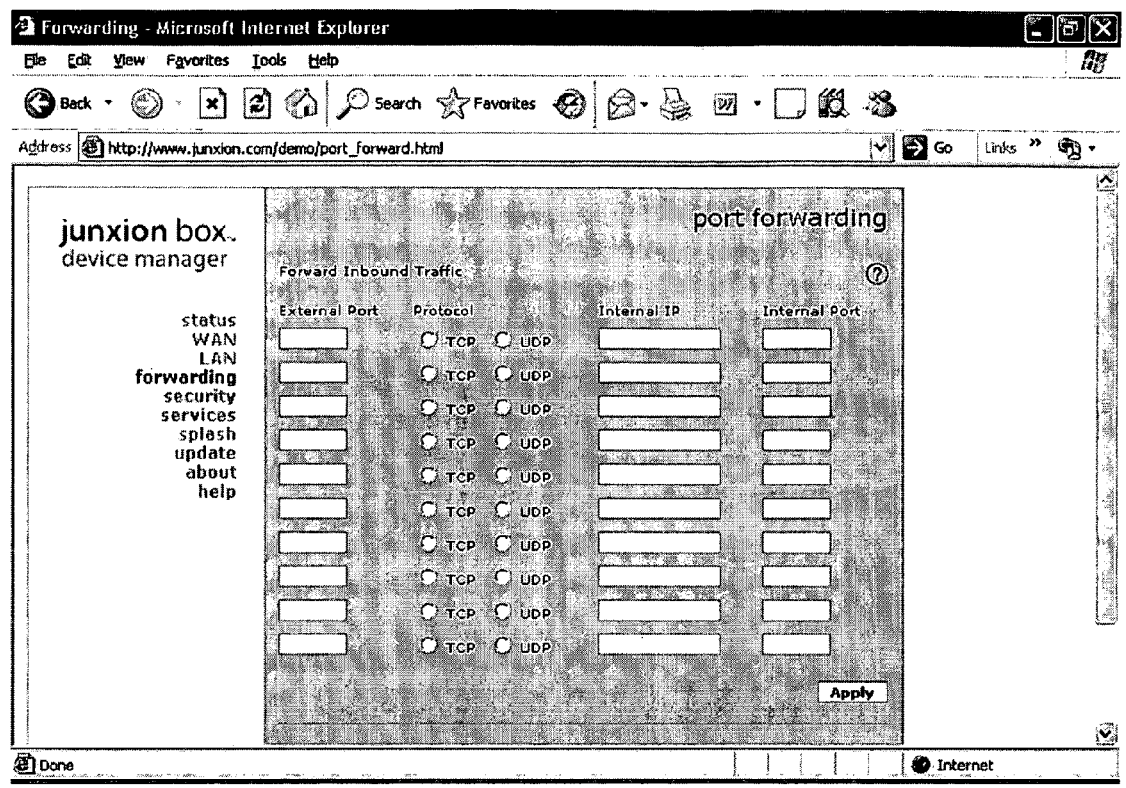
Figure 13:
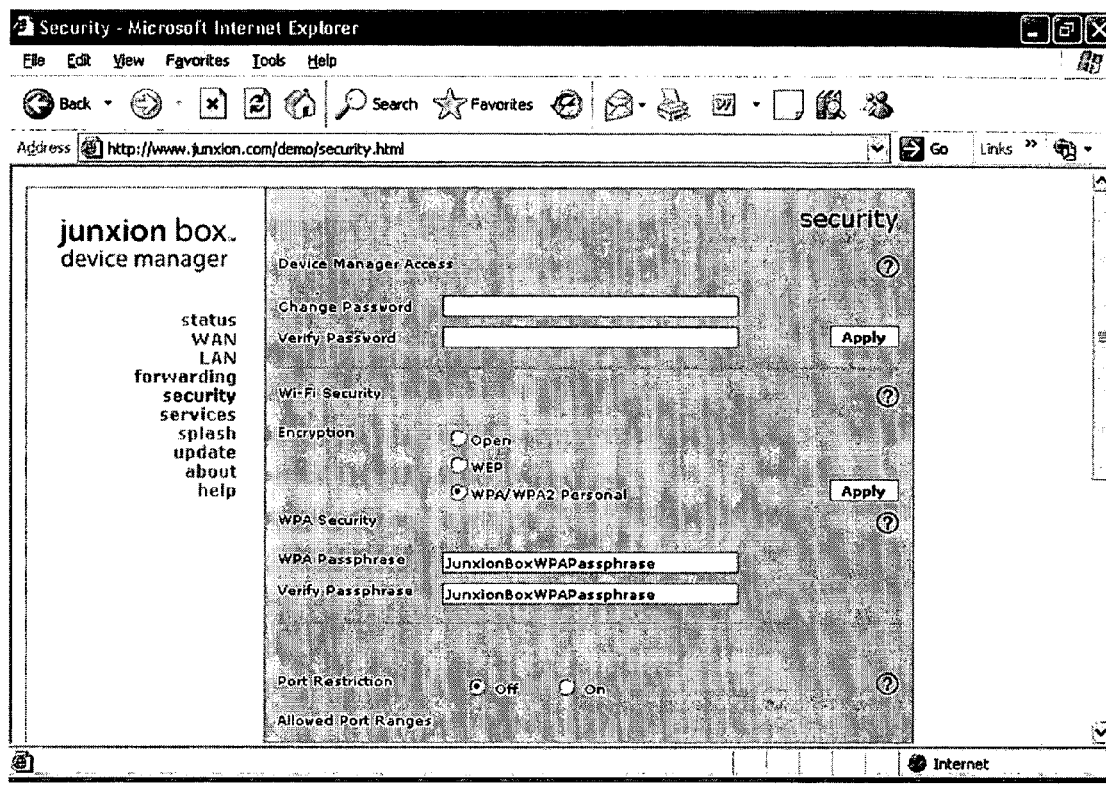
Figure 14:
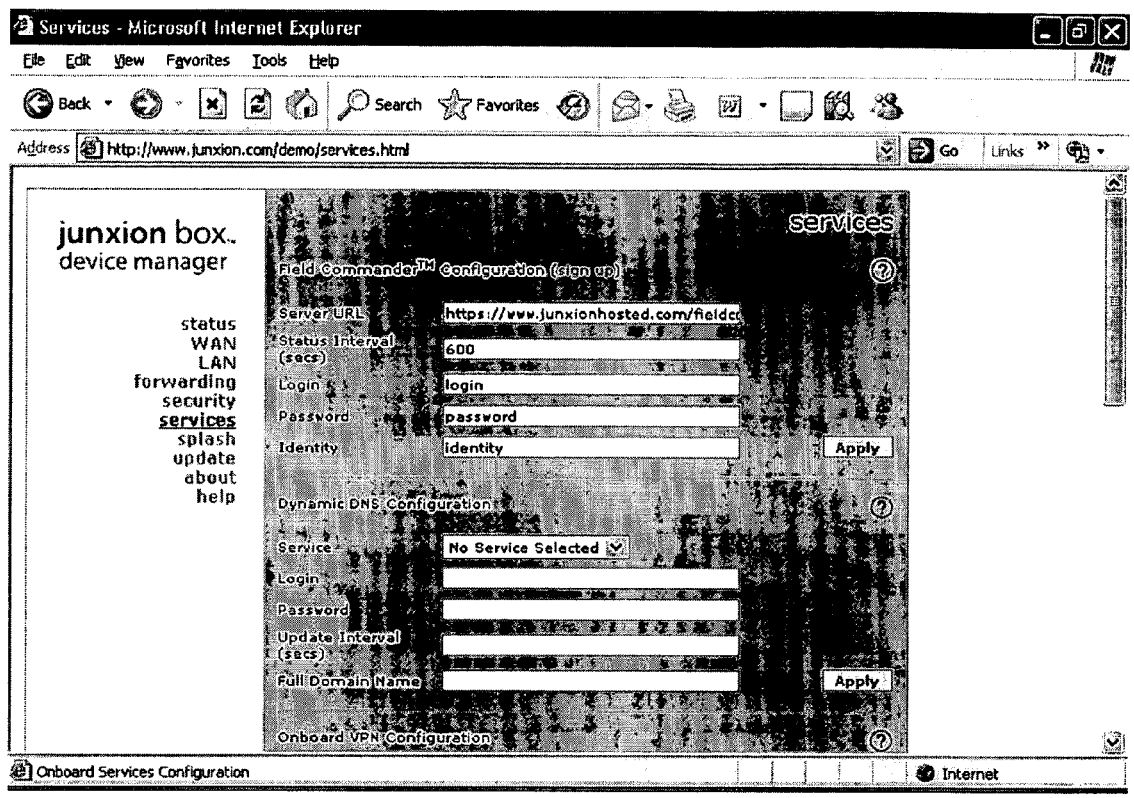
Figure 15:
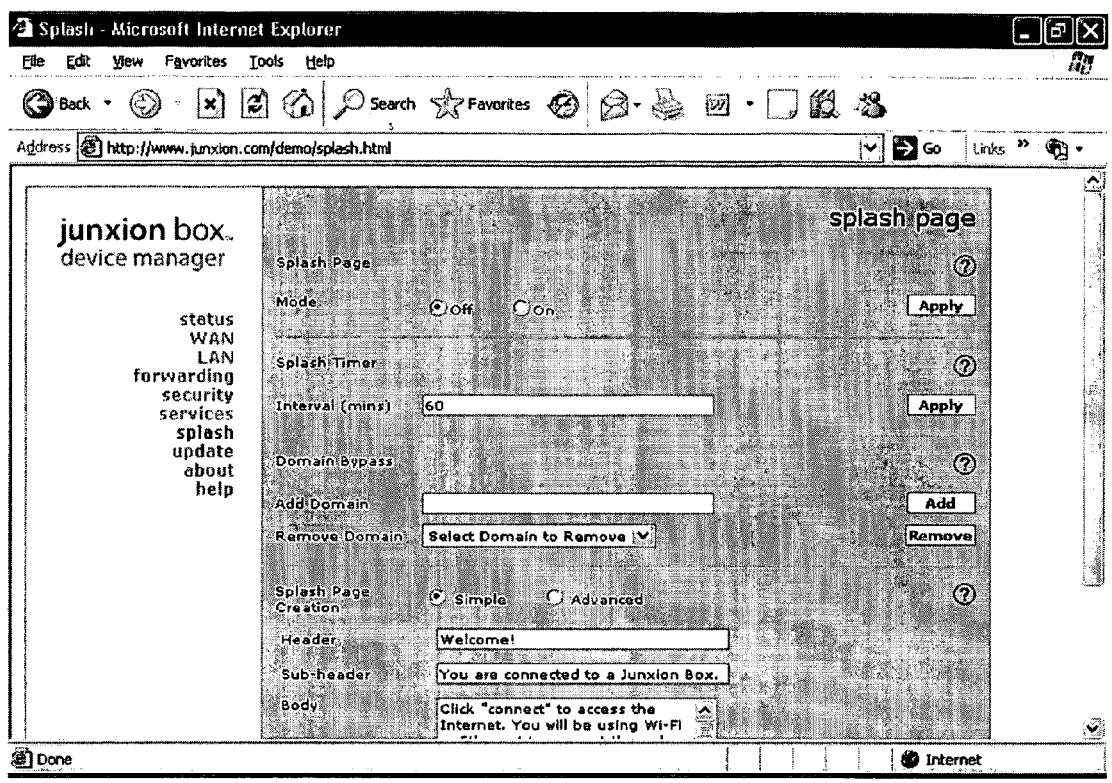
Figure 16:
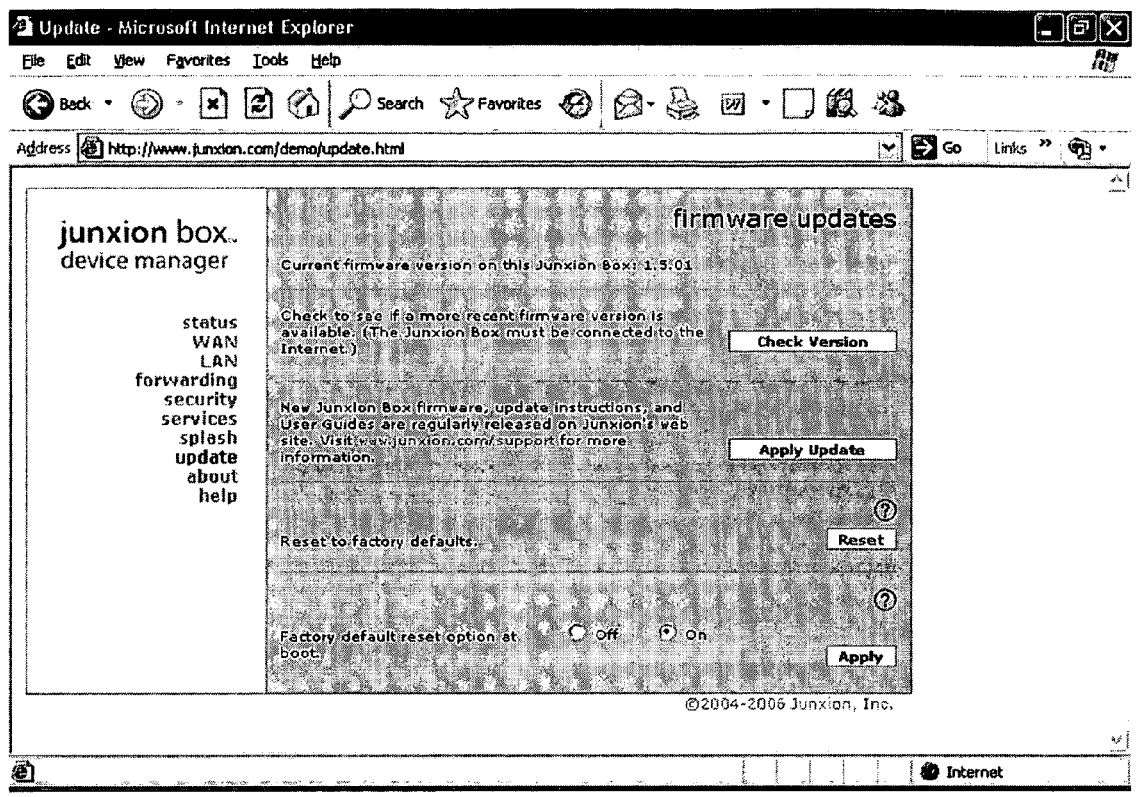

FIG. 8 illustrates the operational flow of selected aspects of regulating network access, in accordance with various embodiments of the invention. As illustrated, prior to determining whether one of its WWAN interfaces is associated with a service agreement, a gateway may establish a connection with a WWAN, block 802. In some embodiments, the WWAN having the resultant connection to the gateway may be associated with a wireless service provider, and the wireless service provider may be party to the service agreement. In other embodiments, prior to establishing a WWAN connection, the gateway may authenticate a user accessing the gateway through a LAN connected to the gateway, block 804. After establishing the connection, block 802, or authenticating the user, block 804, the gateway may then perform the other of the operations. In alternate embodiments, the gateway may only establish the connection, block 802, but not authenticate the user, block 804.

In various embodiments, the gateway may then determine whether its WWAN interface is associated with a service agreement with a wireless service provider, block 806, the service agreement having one or more features outlining gateway usage benefits and restrictions. The gateway may determine the existence of the service agreement and one or more features of any such agreement in a number of ways. The gateway may inquire of a server, such as a server associated with the gateway or with a wireless service provider, as to the existence and features of a service agreement associated with one of a number of inputs, such as an IP address associated with a WWAN interface, an APN, a SIM, a MIN, a SSID, or a LAN user authentication. Exemplary features include a limitation on a number of simultaneous WiFi or Ethernet LAN connections of the gateway, a restriction associated with data ports, a quality of service, a throughput limitation, and a data transfer rate limitation. In addition to providing the features of a service agreement, the server may also return one or more policies of the wireless service provider. In one embodiment, the gateway may also facilitate a subscriber in altering the features of his/her service agreement, block 808.

If the gateway determines the existence of a service agreement, the gateway may provide WWAN access in accordance with either or both the one or more service agreement features and the one or more wireless service provider policies, block 810. On the other hand, if the gateway determines that the WWAN interface is not associated with a service agreement, the gateway may deny access to all WWAN traffic, block 812. In one embodiment, if the gateway determines that service plans are associated with multiple WWAN interfaces, the gateway may coordinate access to the WWAN through the multiple interfaces, block 814. Further, if the WWAN interface provides access to a plurality of WWANs, the gateway may facilitate a user in choosing one of multiple WWANs, block 816.

As is shown, in some embodiments, the gateway may download customizable components and branding indicia of a wireless service provider from the service provider, block 818. The gateway may then render the indicia and components on a user interface to a user, block 820. In various embodiments, the gateway may also receive data from LAN and WWAN devices, block 822, and transmit data to LAN and WWAN devices, block 824, these operations illustrated in FIGS. 3-7 and described in greater detail above.

FIGS. 9-16 illustrate various graphical user interfaces associated with the gateway, in accordance with various embodiments of the invention. In various embodiments, portions of selected graphical user interfaces shown in FIGS. 9-16 may be associated with various discussed functionalities of the gateway. In various other embodiments, various discussed functionality of the gateway may not be associated with any of the graphical user interfaces shown Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed:

1. A method comprising:

establishing, by a gateway, a wireless connection with a first wireless wide area network via a first wireless wide area networking interface of the gateway, wherein the first wireless wide area networking interface is configured to wirelessly receive data from and transmit data to the first wireless wide area network on behalf of a plurality of devices of a local area network (LAN) communicatively coupled with the gateway;

determining, by the gateway, that the first wireless wide area networking interface is associated with a first service agreement of a first wireless service provider;

operating, by the gateway, the first wireless wide area networking interface to receive data from and transmit data to the first wireless wide area network on behalf of the plurality of devices in accordance with the first service agreement;

determining, by the gateway, that a second wireless wide area networking interface of the gateway is associated with a second service agreement of a second wireless service provider; and operating, by the gateway, the second interface in accordance with the second service agreement.

2. The method of claim 1, wherein operating in accordance with the associated first or second service agreement comprises operating in accordance with one or more restrictions of the first or second service agreement and a wireless service provider policy.

3. The method of claim 1, further comprising determining, by the gateway, that a third wireless wide area networking interface of the gateway is not associated with a third service agreement of a third wireless service provider; and preventing, by the gateway, the plurality of devices from accessing the third wireless wide area network.

4. The method of claim 1, further comprising, prior to said determining, authenticating one or more of the plurality of devices of the LAN.

5. The method of claim 1, wherein the first service agreement includes one or more restrictions related to accessibility of the wireless wide area network, including at least one of a limitation on a number of simultaneous WiFi or Ethernet LAN connections of the gateway, a restriction associated with data ports, a quality of service, a throughput limitation, a data transfer rate limitation, a port-forwarding limitation, or an on-board virtual private networking (VPN) limitation.

6. The method of claim 5, wherein the one or more restrictions related to accessibility of the first wireless wide area network further includes one or more restricted time periods of a day.

7. The method of claim 1, further comprising facilitating a user of one of the plurality of devices of the LAN to alter at least one of one or more restrictions of the first service agreement to allow the gateway to operate the first one of the wireless network interfaces to provide more or less wireless wide area network access.

8. The method of claim 1, wherein said determining the first wireless wide area networking interface is associated with a first service agreement is based further on an access point name (APN) assigned by the first wireless service provider to the first wireless wide area networking interface.

9. The method of claim 1, wherein said determining that the first wireless wide area networking interface is associated with a first service agreement is based further on a subscriber identify module (SIM), a mobile identification number (MIN), or an extended service set ID (ESSID) associated with the wireless connection.

10. The method of claim 1, wherein the gateway is further configured to be communicatively coupled to the first wireless service provider via a landline, and the method further comprises coordinating, by the gateway, wired and wireless access in accordance with the one or more restrictions of the first or second service agreement.

11. The method of claim 1, further comprising rendering, by the gateway, to a display, wireless-service-provider customizable indicia including wireless service provider information and a wireless service provider logo.

12. The method of claim 1, further comprising downloading, upon initialization of the first wireless wide area networking interface, one or more customized components and/or indicia from the first wireless service provider.

13. The method of claim 1, wherein the first wireless wide area networking interface is configured to access one or more third wireless wide area networks of one or more third wireless service providers, and the method further comprises facilitating a user, by the gateway, to select one of the one or more third wireless wide area networks for access.

14. A gateway comprising:
a local area networking interface configured to receive data from, and transmit data to one or more devices of a local area network (LAN);

a first and a second wireless wide area networking interfaces configured to be respectively communicatively coupled with a first and a second wide area networks to conditionally wirelessly receive data from and transmit data to the plurality of wireless wide area networks; and logic coupled to the first and second wireless wide area networking interfaces and the local area networking interface and configured to:
establish a wireless connection between the gateway and the first wireless wide area network via the first wireless wide area networking interface, determine the first wireless wide area networking interface is associated with a first service agreement of a first wireless service provider, operate the first wireless wide area networking interface to receive data from and transmit data to the first wireless wide area network on behalf of the one or more devices in accordance with the associated service agreement, determine the second wireless wide area networking interface is associated with a second service agreement of a second wireless service provider, and operate the second wireless wide area networking interface in accordance with the second service agreement.

15. The gateway of claim 14, wherein said to operate in accordance with the associated first service agreement comprises to operate in accordance with one or more restrictions of the first service agreement and a wireless service provider policy.

16. The gateway of claim 14, further comprising a third wireless wide area networking interface, wherein the logic is further configured to determine that the third wireless wide area networking interface is not associated with a third service agreement of a third service provider, and to prevent the one or more devices to access a third wireless wide area network.

17. The gateway of claim 14, wherein the first service agreement includes one or more restrictions related to accessibility of the first wireless wide area network, including at least one of a limitation on a number of simultaneous WiFi or Ethernet LAN connections of the gateway, a restriction associated with data ports, a quality of service, a throughput limitation, a data transfer rate limitation, a port-forwarding limitation, or an on-board virtual private networking (VPN) limitation.

18. The gateway of claim 14, wherein the logic is further configured to facilitate a user of one of the one or more devices of the LAN to alter at least one of the one or more restrictions of the first service agreement to allow the gateway to operate the first wireless wide area networking interface to provide more or less wireless wide area network access.

19. The gateway of claim 14, wherein said to determine the first wireless wide area networking interface is associated with a first service agreement is based further on an access point name (APN) assigned by the first wireless service provider to the first wireless wide area networking interface.

20. The gateway of claim 14, wherein said to determine the first wireless wide area networking interface is associated with a first service agreement is based further on a subscriber identification module (SIM), a mobile identification number (MIN), or an extended service set ID (ESSID) associated with the wireless connection.

21. The gateway of claim 14, wherein the logic is further configured to render, to a display, wireless-service-provider customizable indicia including wireless service provider information and a wireless service provider logo.

22. The gateway of claim 14, wherein the logic is further configured to download, upon initialization of the first wireless service provider's wireless wide area networking interface, one or more customized components and/or indicia from the wireless service provider.

23. An article of manufacture comprising:
   a tangible non-transitory computer-readable storage medium; and
   a plurality of programming instructions stored on the tangible non-transitory computer-readable storage medium, which, upon execution, cause a gateway to perform operations including:
      establishing a wireless connection with a first wireless wide area network via a first wireless wide area networking interface of the gateway, wherein the first wireless wide area networking interface is configured to wirelessly receive data from and transmit data to the wireless wide area network on behalf of a plurality of devices of a local area network (LAN) communicatively coupled with the gateway,
      determining the first wireless wide area networking interface is associated with a first service agreement of a first wireless service provider,
      operating the first wireless wide area networking interface to receive data from and transmit data to the wireless wide area network on behalf of the plurality of devices in accordance with the first service agreement,
      determining a second wireless wide area networking interface of the gateway is associated with a second service agreement of a second wireless service provider, and
      operating the second interface in accordance with the second service agreement.

24. The article of claim 23, wherein said operating in accordance with the first service agreement comprises operating in accordance with one or more restrictions of the first service agreement and a wireless service provider policy.

25. The article of claim 23, wherein the operations further comprising determining that a third wireless wide area networking interface of the gateway is not associated with a third service agreement of a third wireless service provider, and preventing the plurality of devices from accessing the third wireless wide area network.

26. The article of claim 23, wherein the first service agreement includes one or more restrictions related to accessibility of the first wireless wide area network, including at least one of a limitation on a number of simultaneous WiFi or Ethernet LAN connections of the gateway, a restriction associated with data ports, a quality of service, a throughput limitation, a data transfer rate limitation, a port-forwarding limitation, or an on-board virtual private networking (VPN) limitation.

27. The article of claim 23, wherein the operations further comprising facilitating a user of one of the plurality of devices of to alter at least one of the one or more features of the first service agreement to allow the gateway to operate the first wireless wide area networking interface to provide more or less wireless wide area network access.

28. The article of claim 23, wherein said determining the first wireless wide area networking interface is associated with a first service agreement is based further on an access point name (APN) assigned by the first wireless service provider to the first wireless wide area networking interface.

29. The article of claim 23, wherein said determining the first wireless wide area networking interface is associated with a first service agreement is based further on a subscriber identification module (SIM), a mobile identification number (MIN), or an extended service set ID (ESSID) associated with the wireless wide area network connection.

* * * * *